United States Patent
Schieck et al.

(10) Patent No.: US 12,352,349 B2
(45) Date of Patent: Jul. 8, 2025

(54) OIL DRIP PAN, PLANETARY GEARING AND ELECTRIC AXLE DRIVE TRAIN

(71) Applicant: Schaeffler Technologies AG & Co. KG, Herzogenaurach (DE)

(72) Inventors: Robert Schieck, Nuremberg (DE); Thomas Riedel, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/698,496

(22) PCT Filed: Sep. 14, 2022

(86) PCT No.: PCT/DE2022/100677
§ 371 (c)(1),
(2) Date: Apr. 4, 2024

(87) PCT Pub. No.: WO2023/066421
PCT Pub. Date: Apr. 27, 2023

(65) Prior Publication Data
US 2024/0328503 A1 Oct. 3, 2024

(30) Foreign Application Priority Data
Oct. 18, 2021 (DE) .................. 10 2021 126 931.8

(51) Int. Cl.
*F16H 57/04* (2010.01)
(52) U.S. Cl.
CPC ..... *F16H 57/0427* (2013.01); *F16H 57/0482* (2013.01); *F16H 57/0471* (2013.01); *F16H 57/0479* (2013.01)
(58) Field of Classification Search
CPC ............ F16H 57/0427; F16H 57/0482; F16H 57/0471; F16H 57/0479; F16H 57/04; F16H 57/042
(Continued)

(56) References Cited

U.S. PATENT DOCUMENTS 3,502,177 A * 3/1970 Christie .............. F16H 57/0483
184/6.12
5,242,033 A 9/1993 Toraason
(Continued)

FOREIGN PATENT DOCUMENTS

DE 199157 C 7/1907
DE 4417040 C1 6/1995
(Continued)

OTHER PUBLICATIONS

Author: Schneider et al. Source: Highly Integrative and Flexible Electric Drive Unit for E-Vehicles. ATZ, vol. 113 Date: May 1, 2011.

*Primary Examiner* — Roger L Pang

(57) ABSTRACT

An oil drip pan for rotationally fixed placement onto a shaft, which is rotatable about an axis, includes a pan bottom which extends in an axial direction, is closed on the circumference, and from which two pan walls extend radially inwards towards the axis. A channel is defined by the pan bottom and the two pan walls. The channel is arranged to, when the shaft rotates, receive hydraulic fluid. At least portions of the pan bottom have surface structures extending in the axial direction and protruding inwards in a radial direction out of the pan bottom. The surface structures are configured such that the hydraulic fluid flows over the surface structures in a circumferential direction when the shaft rotates, and solid particles from the hydraulic fluid are deposited in pan pockets defined by circumferentially adjacent surface structures.

18 Claims, 4 Drawing Sheets

(58) Field of Classification Search
USPC .................. 475/159; 184/6.12, 6.27, 106
See application file for complete search history.

(56) References Cited

U.S. PATENT DOCUMENTS

| | | | | |
|---|---|---|---|---|
| 12,055,209 B2* | 8/2024 | Schimpf | ............. | F16H 57/0427 |
| 2009/0247348 A1* | 10/2009 | Haupt | ................. | F16C 33/6677 |
| | | | | 475/159 |
| 2023/0069754 A1* | 3/2023 | Uhkötter | ............. | F16H 57/0426 |

FOREIGN PATENT DOCUMENTS

| | | |
|---|---|---|
| DE | 102005054084 A1 | 7/2007 |
| DE | 102010054868 A1 | 6/2012 |
| DE | 102015215280 A1 | 2/2017 |
| DE | 102017106268 A1 | 9/2018 |
| DE | 102018123592 A1 | 3/2020 |
| EP | 1785646 A1 | 5/2007 |
| WO | 8100005 | 1/1981 |
| WO | 2014155453 A1 | 10/2014 |

* cited by examiner

OIL DRIP PAN, PLANETARY GEARING AND ELECTRIC AXLE DRIVE TRAIN

CROSS-REFERENCE TO RELATED APPLICATIONS

This application is the U.S. National Phase of PCT Appln. No. PCT/DE2022/100677 filed Sep. 14, 2022, which in turn claims priority to DE102021126931.8 filed Oct. 18, 2021, the entire disclosures of which are incorporated by reference herein.

TECHNICAL FIELD

The present disclosure relates to an oil drip pan for rotationally fixed placement on a shaft rotatable about an axis, the oil drip pan having a circumferentially closed pan bottom which extends in the axial direction, from which pan bottom two pan walls extend radially inwards in the direction of the axis, wherein, when the shaft rotates, hydraulic fluid can be admitted to the channel defined by the pan bottom and the two pan walls. The disclosure further relates to a planetary gearing and an electrical axle drive train.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, volume 113, May 2011, pages 360-365 by Erik Schneider, Frank Fickl, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles]. This article describes a drive unit for an axle of a vehicle, which comprises an electric motor that is arranged so as to be concentric and coaxial with a bevel gear differential, wherein a switchable 2-speed planetary gear set is arranged in the power train between the electric motor and the bevel gear differential and is also positioned to be coaxial with the electric motor or the bevel gear differential or spur gear differential. The drive unit is very compact and allows for a good compromise between climbing ability, acceleration and energy consumption due to the switchable 2-speed planetary gear set. Such drive units are also referred to as e-axles or electrically operable drive trains.

In addition to purely electrically operated drive trains, hybrid drive trains are also known. Such drive trains of a hybrid vehicle usually comprise a combination of an internal combustion engine and an electric motor, and enable—for example in conurbations—a purely electric mode of operation with both sufficient range and availability, in particular when driving cross-country. In addition, there is the possibility of driving the internal combustion engine and the electric motor at the same time in certain operating situations.

In the development of electrical machines intended for e-axles or hybrid modules, there is a continuing need to increase their power densities, so the cooling of electrical machines required for this is growing in importance. Owing to the necessary cooling capacities, hydraulic fluids such as cooling oils have become established in most concepts for the removal of heat from the thermally loaded regions of an electrical machine.

At the same time, gearing assemblies in e-axles or hybrid modules require sufficiently good lubrication in order to provide not only cooling of the thermally stressed components but also sufficiently good lubrication for low friction losses of the gearing assembly. Planetary gearings, for example also as differential gearings, are often used in gearing assemblies used in e-axles or hybrid modules.

The structure of a planetary gearing in a motor vehicle transmission includes at least one planetary gear set, in which planetary gears are rotatably arranged on a planetary gear pin in a rollingly or slidingly mounted manner, which is accommodated in a planetary carrier. Effective lubrication of the planetary gear bearing arrangement and the dissipation of frictional heat are crucial for long-term function and to achieve a long service life of the planetary gearing arrangement. An oil is supplied as a lubricant, in particular from the direction of an input shaft or output shaft arranged centrally in the planetary drive, preferably by centrifugal force via oil channels or bores of the planetary gear bearing arrangement.

DE 10 2010 054 868 A1 shows a planetary gearing that can be used as a differential, preferably as an axle differential. To lubricate the planetary gear bearing arrangement, the planetary gear pin includes a lubricating oil channel designed as a stepped bore, from which the lubricating oil flows via radial bores to the bearing arrangement of the planetary gear. By means of an oil drip pan inserted into the lubricating oil channel on the inlet side, a targeted supply of lubricating oil is ensured.

According to DE 10 2005 054 084 A1, the planetary gear carrier of a planetary gearing includes an oil collecting ring which forms a groove profile and which has an opening that is aligned with the rotational axis of the planetary gear carrier. Multiple oil guide channels are provided on the groove profile on the side of the oil collecting ring facing the planetary gear carrier, via which oil guide channels the oil is guided from the channel profile to the bearing arrangement of the planetary gear.

Furthermore, DE 199157 A1 discloses a lubricant feed by means of centrifugal force for lubricating the planetary gear bearing arrangement. The oil is introduced into a central bore of the planetary gear pin via an oil collecting device and from there reaches the bearing arrangement of the planet wheel via radial openings.

The patent EP 178 56 46 B1 shows a section of an automatic transmission intended for a motor vehicle, which includes a planetary gearing with a planetary carrier. Planetary gears are rotatably mounted on planetary gear pins fixed in the planetary carrier. An oil drip pan has a radial, disc-like section which merges radially on the outside into a groove, from which a connection piece connects, which engages in a receptacle of the planetary gear pin. The oil entering the planetary gear pin is guided via a transverse bore to the bearing point of the planetary gear on the planetary gear pin.

With all of the concepts listed for cooling and/or lubrication of the planetary gearing, particles, for example from abrasion, can be transported through the hydraulic paths and lead to undesirably high levels of wear, particularly in bearing points.

SUMMARY

The present disclosure provides an oil drip pan which realizes a particle separation function, which in particular reduces or completely prevents the ingress of particles into a bearing point. The present disclosure further provides an improved planetary gearing and a wear-optimized axle drive train.

According to an exemplary embodiment of the present disclosure, an oil drip pan for rotationally fixed placement on a shaft rotatable about an axis is provided, wherein the oil drip pan has a circumferentially closed pan bottom which extends in the axial direction, from which pan bottom two pan walls extend radially inwards in the direction of the axis, wherein, when the shaft rotates, hydraulic fluid can be admitted to the channel defined by the pan bottom and the two pan walls, wherein the pan bottom at least in portions has surface structures which extend in an axial direction, which protrude in a radial direction inwards out of the pan bottom, over which surface structures the hydraulic fluid can flow in the circumferential direction when the shaft rotates and which are designed in such a way that solid particles from the hydraulic fluid settle in the pan pockets defined by circumferentially adjacent surface structures.

This has the advantage that targeted centrifugal force-assisted sedimentation and thus removal of solid particles from the hydraulic fluid can take place, for example during operation of an oil-lubricated transmission. In particular, non-ferromagnetic particles can also be removed from the hydraulic fluid by means of centrifugal force-assisted sedimentation. This directly results in an improvement in the service life of, for example, a gearing assembly provided with the oil drip pan according to the invention.

There are surface structures on the bottom of the oil drip pan, which in particular create barrages or calming spaces, which serve to ensure that particles in the hydraulic fluid can settle along the surface structures by locally reducing the flow speed of the hydraulic fluid. The settling process is additionally supported by the centrifugal forces that act, for example, during operation of a transmission. Hydraulic fluid that flows over the barrages or calming spaces and is thus cleaned can then be discharged along a hydraulic path and, for example, fed to a bearing point. The total volumes used to deposit solid particles from the hydraulic fluid in the surface structures should advantageously be larger than the expected abrasion over the service life in order to always be able to maintain a cleaning effect through the oil drip pan. The geometry of the surface structures may be formed by barrages and calming spaces in the flow direction of the hydraulic fluid over the surface structures. For example, the barrages and/or calming spaces of the surface structures can have suitable angles of inclination, step height and/or microgeometries which, with regard to the local flow conditions on the surface structures, are suitable for realizing a centrifugal force-assisted sedimentation of solid particles from the hydraulic fluid. This can be determined, for example, using flow simulations and designed accordingly.

The oil drip pan according to the preset disclosure may be particularly intended for use in an electric axle drive train. An electric axle drive train of a motor vehicle may comprise at least one electric machine and at least one gearing assembly, wherein the electric machine and the gear assembly may, in each case, form a structural unit. The electric axle drive train may have a first electric machine with a first gearing assembly and a second electric machine with a second gearing assembly.

It is possible in particular for an electric machine and a gearing assembly in each case to be arranged in a common drive train housing. Alternatively, it would of course also be possible for the electric machine to have a motor housing and the transmission to have a transmission housing, wherein the structural unit can then be brought about by fixing the gearing assembly in relation to the electric machine. This structural unit is sometimes also referred to as an e-axle.

In the context of the present disclosure, the electric machine can be configured as a radial or axial flux machine. To form an axially particularly compact axle drive train, preference should be given to axial flux machines. The electric machine is intended in particular for use within an electrically operable drive train of a motor vehicle.

In particular, the electric machine is dimensioned such that vehicle speeds of more than 50 km/h, preferably more than 80 km/h and in particular more than 100 km/h can be achieved. The electric motor particularly may have an output of more than 30 kW, preferably more than 50 KW and in particular more than 70 KW. Furthermore, it is preferred that the electric machine provides speeds greater than 5000 rpm, particularly preferably greater than 10,000 rpm, very particularly preferably greater than 12,500 rpm.

The gearing assembly of the electric axle drive train can be coupled in particular to the electric machine, which is designed to generate a drive torque for the motor vehicle. The drive torque may particularly be a main drive torque, such that the motor vehicle is driven exclusively by the drive torque.

The gearing assembly can have a planetary gearing and/or a differential gearing. A differential gearing is a planetary gearing with one input and two outputs. It usually has the function of driving two vehicle wheels of a motor vehicle in such a way that they can turn at different speeds when cornering, but with the same propulsive force.

The oil drip pan according to the present disclosure may be configured for use in a planetary gearing.

The oil drip pan can be formed from a plastic or a metallic material, for example, aluminum. The oil drip pan may be made of a plastic using an injection molding process.

According to embodiments of the present disclosure, it is possible for at least one of the pan walls to be formed monolithically with the pan bottom and/or at least one of the pan walls to be formed by a component which rests against the pan bottom.

According to embodiments of the present disclosure, it is also possible for the pan bottom to be completely covered in the circumferential direction by surface structures, whereby a very high sedimentation rate of particles can be achieved.

Furthermore, according to embodiments of the present disclosure, it is possible for the surface structures to be shaped in a tooth-like manner, each with a first tooth flank and a second tooth flank, which have different angles of inclination from one another, which has proven to be a particularly effective geometry for the separation of particles from the hydraulic fluid.

According to embodiments of the present disclosure, it is possible for the tooth-like surface structures to be substantially identical, which contributes to uniform sedimentation over the circumference of the pan bottom.

Furthermore, the present disclosure can also be further developed in such a way that at least one of the pan walls has an opening for a planetary pin to pass through, whereby the oil drip pan can be easily and securely coupled to a planetary gearing. In embodiments of the present disclosure, it is also possible in this context for at least one of the pan walls to have at least three openings distributed over its circumference for the passage of a planetary pin in each case, whereby a clear position of the oil drip pan on a planetary carrier of a planetary gearing can be defined.

It can also be advantageous to further develop the present disclosure in such a way that the pan bottom in the region of the opening has a wall section which extends radially inwards out of the pan bottom and which defines a cup-like reservoir with the pan wall comprising the opening. The advantage that is realized in this way is that a type of "baffle wall" is created over which the hydraulic fluid has to flow before it is guided via the shaft or the planetary pin, for example to a lubricated roller bearing.

The present disclosure further provides a planetary gearing, in particular for an electrically operable axle drive train of a motor vehicle, comprising a planetary gear carrier and the oil drip pan connected for conjoint rotation with the planetary gear carrier.

Finally, the present disclosure further provides an electrically operable axle drive train comprising an electric machine and the planetary gearing coupled to the electric machine.

BRIEF DESCRIPTION OF THE DRAWINGS

The present disclosure is explained in more detail below with reference to drawings without limiting the general concept of the present disclosure.

In the drawings.

DETAILED DESCRIPTION

Figure 1:
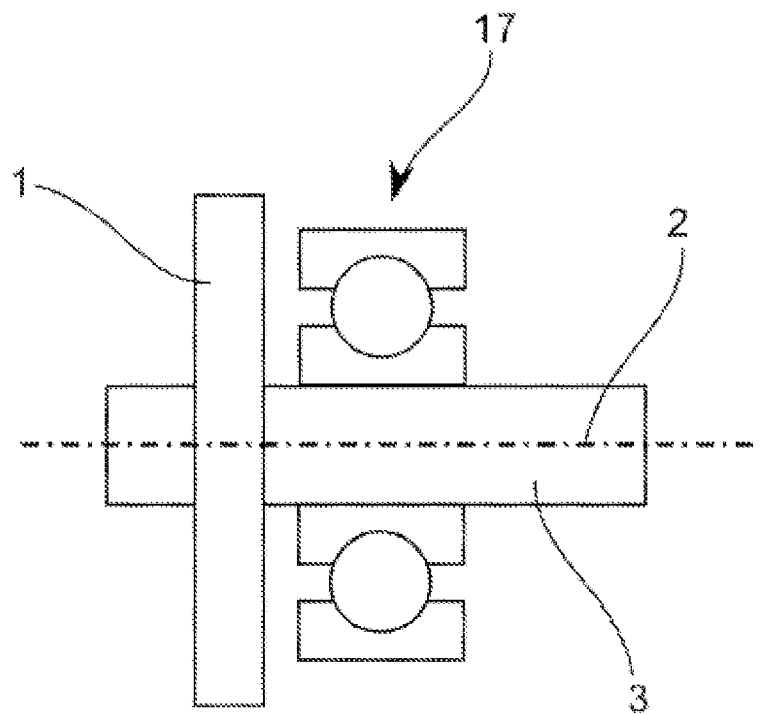
FIG. 1 shows an oil drip pan on a roller bearing-guided shaft in a schematic axial sectional view.

FIG. 1 shows an oil drip pan 1 for rotationally fixed placement on a shaft 3 rotatable about an axis 2. The oil drip pan 1 is configured in such a way that a hydraulic fluid 7 is supplied to the roller bearing 17 when the shaft 3 rotates and lubricates said roller bearing 17. This is explained in more detail below with reference to FIG. 2.

Figure 2:
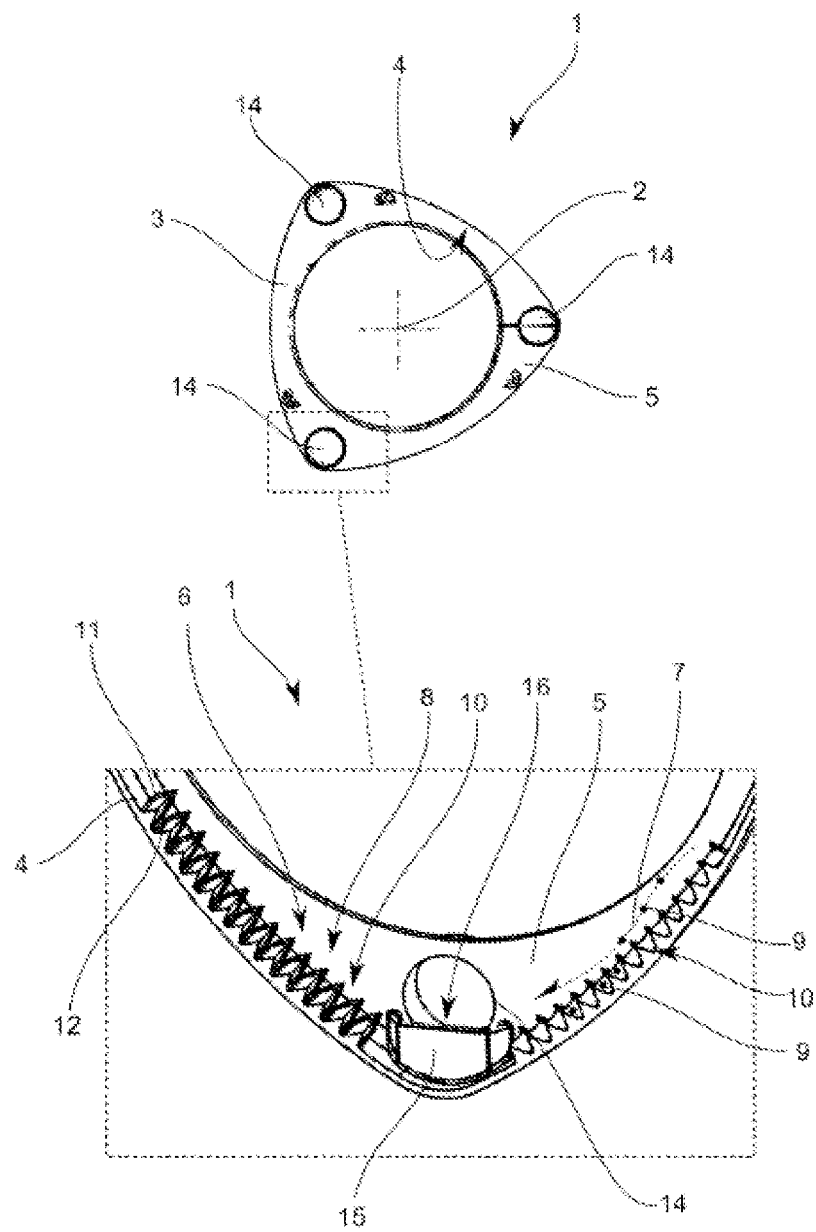
FIG. 2 shows an oil drip pan in a perspective overview and a detailed view.
Figure 3:
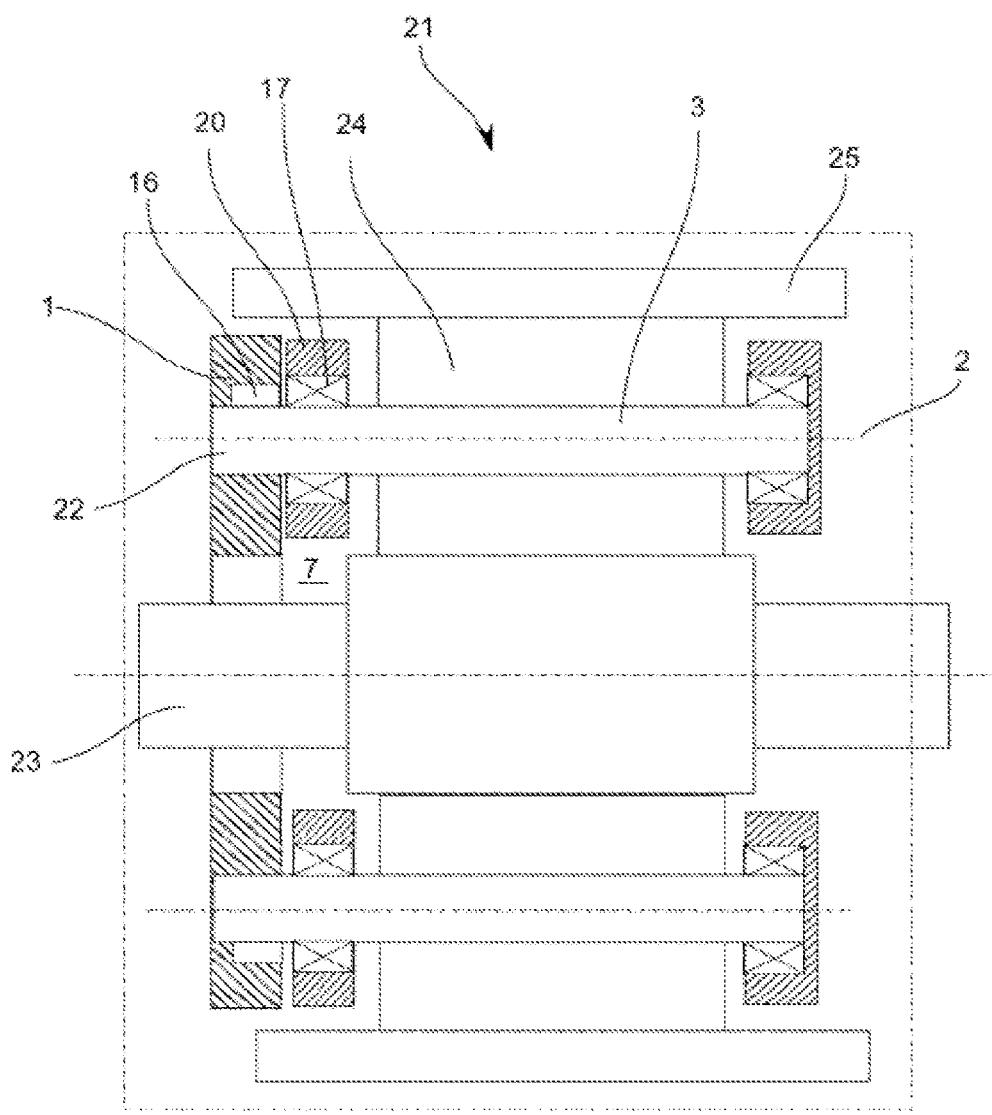
FIG. 3 shows a planetary gearing with an oil drip pan in a schematic axial sectional view.

The oil drip pan 1 shown in FIG. 2 is intended for use in a planetary gearing 21, as shown as an example in FIG. 3. The annular oil drip pan 1 has an axially extending, circumferentially closed pan bottom 4, from which two pan walls 5 extend radially inwards towards the axis 2. In the representation in FIG. 2, however, only one of the pan walls 5 is shown in the bottom detailed view in order to allow a view into the interior of the oil drip pan 1.

The pan wall 5 visible in FIG. 2 is formed monolithically with the pan bottom 4. The pan wall 5, not shown in FIG. 2, is formed by a component which rests on the pan bottom 4, for example a housing component of a planetary gearing 21.

The channel 6 defined by the pan bottom 4 and the two pan walls 5 is acted upon by a hydraulic fluid 7 during rotation about the axis 2. The hydraulic fluid 7 then usually moves in the direction of rotation of the oil drip pan 1.

The pan bottom 4 at least in portions has surface structures 8 which extend in the axial direction and protrude inwards out of the pan bottom 4 in the radial direction, over which surface structures the hydraulic fluid 7 can flow in the circumferential direction when the shaft 3 rotates and which are designed in such a way that solid particles 9 from the hydraulic fluid 7 settle in pan pockets 10 defined by circumferentially adjacent surface structures 8.

As shown in FIG. 2, the surface structures 8 of the embodiment shown are shaped in a tooth-like manner, each with a first tooth flank 11 and a second tooth flank 12, which have different angles of inclination from one another. Each pan pocket 10 is formed between two first and second tooth flanks 11, 12 that are adjacent in the circumferential direction. The tooth-like surface structures 8 are substantially identical. The pan walls 5 extend in the radial direction over the height of the tooth structures 11, 12.

If the oil drip pan 1 is rotated about the axis 2 during operation, the hydraulic fluid 7 loaded with solid particles 9 is pressed radially outwards against the pan bottom 4 by centrifugal force. At the same time, a relative movement of the hydraulic fluid 7 relative to the pan bottom 4 takes place in the circumferential direction, which is indicated by the arrow in FIG. 2. The flow speed of the hydraulic fluid 7 is locally reduced on the tooth-like surface structures 8, which, together with the centrifugal force acting on the solid particles 9, leads to sedimentation and immobilization of the solid particles 9 in the pan pockets 10.

One of the pan walls 5 comprises three openings 14, distributed over its circumference, for the passage of a planetary pin 22 of a planetary gearing 21 in each case, as can be seen from an overview of FIG. 2 with FIG. 3. It should be noted that planetary pin 22 is the same component as, and may be referred to as, shaft 3 discussed above. The pan bottom 4 has a contour which deviates from the circular ring shape and which supports targeted guidance of the hydraulic fluid 7 to the openings 14. For this purpose, the pan bottom 4 has an arcuate contour in each case between two circumferentially adjacent openings 14.

The pan bottom 4, in the region of an opening 14, also has a wall section 15 which extends radially inwards out of the pan bottom 4 and which defines a cup-like reservoir 16 with the pan wall 5 comprising the opening 14.

Figure 4:
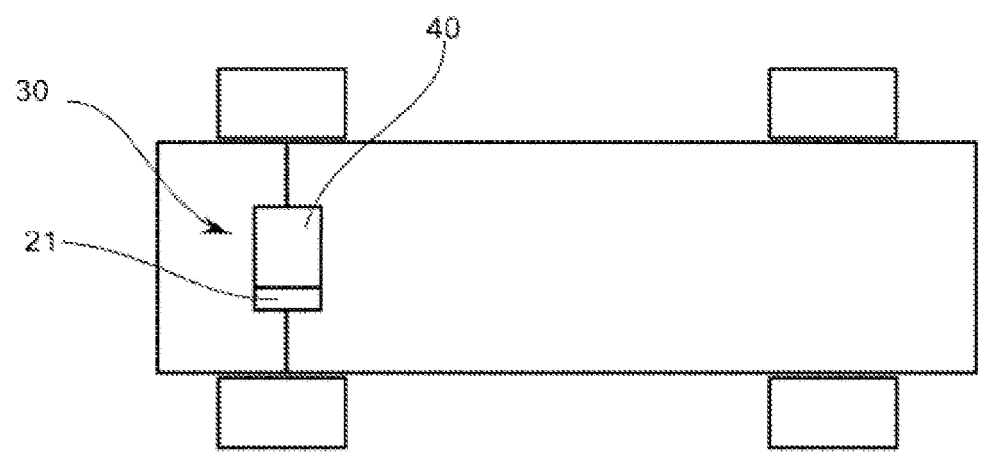
FIG. 4 shows a motor vehicle with an axle drive train in a schematic block diagram view.

FIG. 3 shows a planetary gearing 21 which is wet-running via a hydraulic fluid 7 for an electrically operable axle drive train 30 of a motor vehicle, as is also shown as an example in FIG. 4. The planetary gearing 21 comprises a planetary gear carrier 20, in which a plurality of planetary gears 24 are rotatably mounted about their longitudinal axis, which in turn mesh with the sun gear 23 and the ring gear 25. The oil drip pan 1, as is known from FIG. 2, is connected in a rotationally fixed manner to the planetary gear carrier 20. It is easy to see how the hydraulic fluid 7 can be supplied via the reservoir 16 of the oil drip pan 1 via the planetary pin 22 of the planetary gear 3 to the roller bearing 17, which supports the planetary gear 3 relative to the planetary gear carrier 20.

Finally, FIG. 4 shows an electrically operable axle drive train 30 comprising an electric machine 40 and a planetary gearing 21 coupled to the electric machine 40, as is known, for example, from FIG. 3.

The present disclosure is not limited to the embodiments shown in the figures. The above description is therefore not to be regarded as limiting, but rather as illustrative. The following claims are to be understood as meaning that a stated feature is present in at least one embodiment of the present disclosure. This does not exclude the presence of further features. Where the claims and the above description define 'first' and 'second' features, this designation serves to distinguish between two features of the same type without defining an order of precedence.

LIST OF REFERENCE SIGNS

1 Oil drip pan
2 Axis

3 Shaft
4 Pan bottom
5 Pan walls
6 Channel
7 Hydraulic fluid
8 Surface structures
9 Solid particles
10 Pan pockets
11 Tooth flank
12 Tooth flank
14 Opening
15 Wall section
16 Reservoir
17 Roller bearing
20 Planetary gear carrier
21 Planetary gearing
22 Planetary pin
23 Sun gear
24 Planetary gear
25 Ring gear
30 Axle drive train
40 Electric machine

The invention claimed is:

1. An oil drip pan for rotationally fixed placement on a shaft rotatable about an axis, comprising:
a circumferentially closed pan bottom which extends in an axial direction;
two pan walls extend, from the pan bottom, radially inwards towards the axis, the pan bottom and the two pan walls defining a channel arranged to receive hydraulic fluid when the shaft rotates;
wherein the pan bottom, at least in portions, has surface structures which extend in the axial direction and protrude inwards out of the pan bottom in a radial direction, the surface structures being configured such that the hydraulic fluid flows in a circumferential direction over the surface structures when the shaft rotates and solid particles from the hydraulic fluid settle in pan pockets defined by circumferentially adjacent surface structures; and
wherein at least one of the pan walls has an opening for passage of the shaft, said shaft being a planetary pin.

2. The oil drip pan according to claim 1, wherein at least one of the pan walls is formed monolithically with the pan bottom.

3. The oil drip pan according to claim 1, wherein the pan bottom is completely covered in the circumferential direction by the surface structures.

4. The oil drip pan according to claim 1,
wherein the surface structures are each shaped in a tooth-like manner, each surface structure including a first tooth flank and a second tooth flank, which have different angles of inclination from one another.

5. The oil drip pan according to claim 4, wherein the tooth-like surface structures are designed substantially identically.

6. The oil drip pan according to claim 1, wherein at least one of the pan walls has at least two further openings, the opening and the further openings distributed over a circumference of the corresponding pan wall for passage of respective planetary pins.

7. The oil drip pan according to claim 1, wherein the pan bottom, adjacent to the opening, has a wall section which extends radially inwards out of the pan bottom and which with the pan wall comprising the opening defines a cup-like reservoir.

8. The oil drip pan according to claim 1, wherein at least one of the pan walls is formed by a component which rests against the pan bottom.

9. The oil drip pan according to claim 7, wherein the cup-like reservoir is configured to provide, via the planetary pin, the hydraulic fluid to a roller bearing supporting the shaft.

10. A planetary gearing, comprising:
a planetary gear carrier comprising a shaft; and
an oil drip pan connected in a rotationally fixed manner to the planetary gear carrier, the oil drip pan including:
a circumferentially closed pan bottom extending in an axial direction;
two pan walls extending, from the pan bottom, radially inwards towards the axis, the pan bottom and the two pan walls defining a channel arranged to receive hydraulic fluid when the shaft rotates;
wherein the pan bottom, at least in portions, has surface structures which extend in the axial direction and protrude inwards out of the pan bottom in a radial direction, the surface structures being configured such that the hydraulic fluid flows in a circumferential direction over the surface structures when the shaft rotates and solid particles from the hydraulic fluid settle in pan pockets defined by circumferentially adjacent surface structures; and
wherein the surface structures are each shaped in a tooth-like manner, each surface structure including a first tooth flank and a second tooth flank, which have different angles of inclination from one another.

11. An electrically operable axle drive train comprising an electric machine and a planetary gearing coupled to the electric machine according to claim 10.

12. The planetary gearing according to claim 10, wherein at least one of the pan walls is formed monolithically with the pan bottom.

13. The planetary gearing according to claim 10, wherein at least one of the pan walls is formed by a component which rests with play against the pan bottom.

14. The planetary gearing according to claim 10, wherein the pan bottom is completely covered in the circumferential direction by the surface structures.

15. The planetary gearing according to claim 10, wherein at least one of the pan walls has an opening for passage of the shaft, said shaft being a planetary pin.

16. The planetary gearing according to claim 15, wherein at least one of the pan walls has at least two further openings, the opening and the further openings distributed over a circumference of the corresponding pan wall for passage of respective planetary pins.

17. The planetary gearing according to claim 15, wherein the pan bottom, adjacent to the opening, has a wall section which extends radially inwards out of the pan bottom and which with the pan wall comprising the opening defines a cup-like reservoir.

18. The planetary gearing according to claim 17, wherein the cup-like reservoir is configured to provide, via the planetary pin, the hydraulic fluid to a roller bearing supporting the planetary gear carrier.

* * * * *